Nov. 20, 1934.  C. O. ASSMUS  1,981,492
OPTICAL SYSTEM
Original Filed April 11, 1930   3 Sheets-Sheet 1

INVENTOR
Cyril O. Assmus,
BY
ATTORNEY

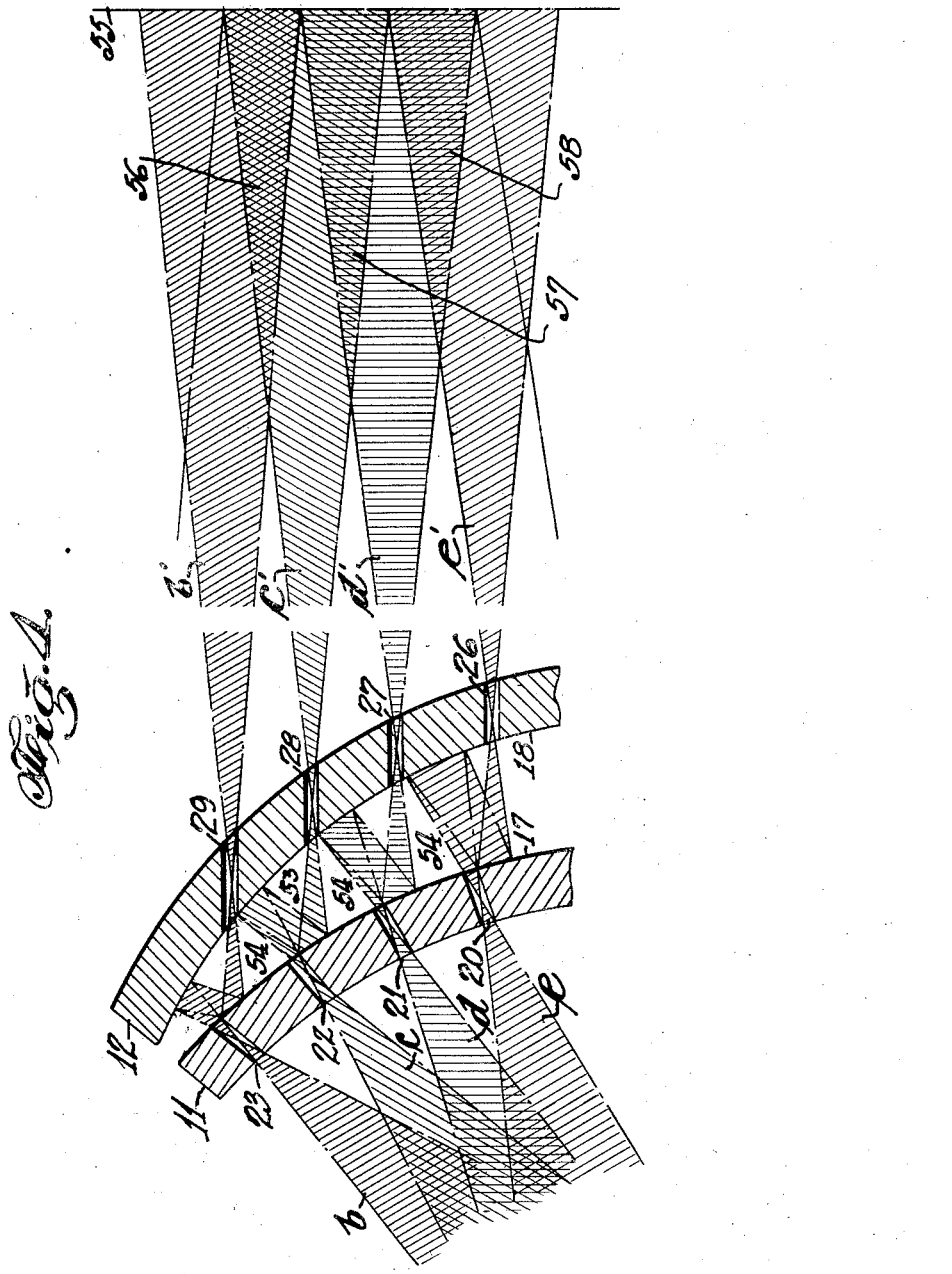

Nov. 20, 1934.  C. O. ASSMUS  1,981,492
OPTICAL SYSTEM
Original Filed April 11, 1930   3 Sheets-Sheet 3
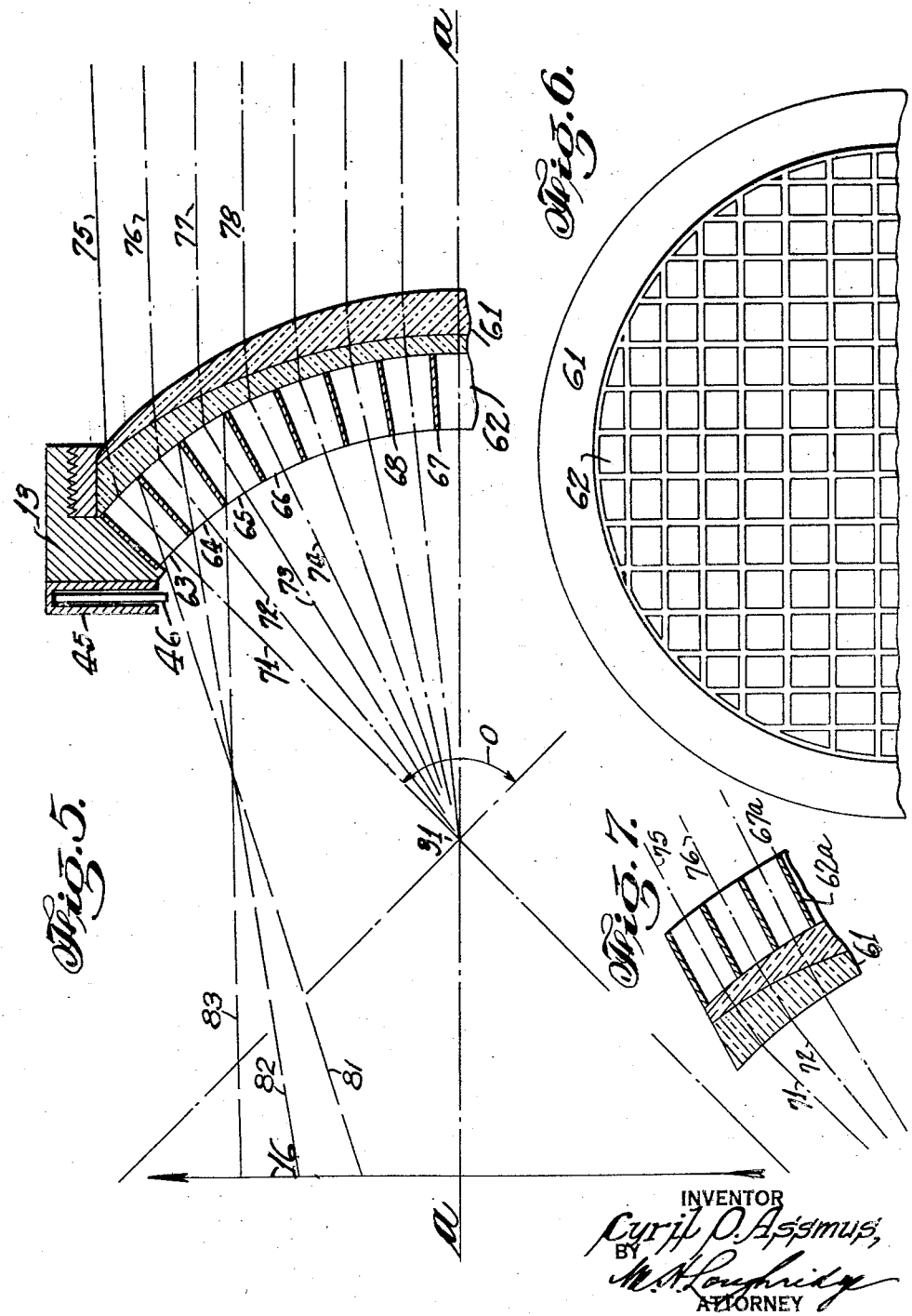
INVENTOR
Cyril O. Assmus,
BY
ATTORNEY Patented Nov. 20, 1934

1,981,492

UNITED STATES PATENT OFFICE 1,981,492

OPTICAL SYSTEM

Cyril O. Assmus, New York, N. Y.

Application April 11, 1930, Serial No. 443,300
Renewed April 20, 1934

17 Claims. (Cl. 88—57)

This invention relates to an optical system and has for its objects; to make the use of large lenses in photography and in projecting machines possible; to control the light rays passing through the lens in a predetermined manner; to make the use of lenses having a much greater surface area than other lenses of the same focal length and speed possible; to make the images projected by any selected portion of the peripheral area of a lens as efficient as images projected through the central portion of lenses now in common use; to superimpose images projected through adjacent, selected portions of the lens and to exclude images projected from remote portions of the lens; to provide for the isolation of rays or pencils of light from a predetermined direction through selected apertures in the light controlling system, and to prevent other rays from passing through the lens system. Another object of the invention is to provide a large lens for a camera in which the rays of light cross at a point located between the lens and the object; another object of the invention is to secure uniform illumination over the entire plate of a camera; these and other objects of the invention will be more particularly understood from the following specifications and the accompanying drawings selected to show the application of this invention, and in which, Fig. 1 is a diagram illustrating my invention applied to a reflector type of lens which is shown in section;

Fig. 4 is a diagram illustrating the projection of the isolated light beams through the lens arrangement;

Fig. 5 is a diagram showing my invention applied to a meniscus lens with a shield in front of the lens indicated in sectional elevation;

Fig. 6 is an elevation of the arrangement shown in Fig. 5 from the object side, and, Fig. 7 is a fragmentary elevation of an arrangement similar to Fig. 5, but with the shielding device on the opposite face of the lens.

In the photographic art, extreme wide angle lenses present certain undesirable characteristics which the present arrangement avoids. With the ordinary wide angle lens an extreme oblique ray strikes the outer portion of the plate at an acute angle so that the image resulting therefrom is generally distorted. In the present arrangement, a shield is provided in front of the lens which isolates certain light rays into specific beams bearing directly upon the object in a predetermined direction and excludes all other beams, particularly those which would otherwise fall obliquely upon the plate. This, naturally, reduces the amount of light passing through the lens and, in consequence, reduces its speed. However, in the present system the diameter of the lens is increased with relation to the plate area to be covered and the focal length of the system, resulting in equal illumination of the image over the entire plate area and increased light values which assures speed in operation.

This invention is an improvement upon my copending application, Serial No. 203,631, filed July 5, 1927. The term "lens" as used herein, includes both a lens and a reflector where these devices may be alternately used.

Figure 3:
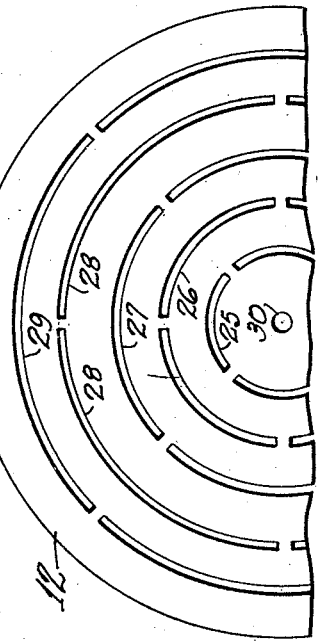
Fig. 3 is an elevation of Fig. 1 from the plate side.
Figure 2:
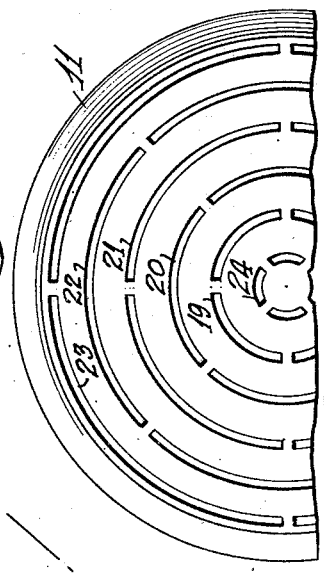
Fig. 2 is an elevation of Fig. 1 from the object side.

In the drawings, 11 is a section of a spherical reflector which is opposed by a second spherical reflector 12. These reflectors are detachably mounted in a lens ring 13, screwed into the housing 14 which supports the plate 15 to receive the image of the object. The opposing surfaces 17 and 18 of the reflectors 11 and 12 are suitably silvered or otherwise made light reflecting and 11 is provided with a row of annular apertures, 19, 20, 21, 22, and 23 which are arranged parallel to a line passing through the point 31 on the principal axis a—a of the system, and these apertures incline towards the axis a—a at point 31. The reflector 12 is provided with a series of complementary apertures 25, 26, 27, 28 and 29 which are substantially parallel to the axis a—a. These apertures, it will be noted, from Figs. 2 and 3, are circular in shape and permit the passage of annular bands of light through said apertures to the plate or screen.

The image of the object 16 passes through the apertures of the reflector arrangement to the plate 15 as indicated by the ray 32 passing through aperture 20 and reflected from surface 18 back to surface 17 indicated at 33 and then through aperture 26 and by 34 to the plate. Beam 35 passes through aperture 21 to surface 18 and is reflected back to surface 17 as indicated at 36 and through aperture 27 continues as indicated at 37 to the plate. Light beam 38 passes through aperture 22 to surface 18 and is reflected back upon 17 as indicated at 39 and through aperture 28 continues to plate 15 as indicated at 40. This arrangement is maintained for any number of apertures that may be provided in the device.

The arrangement of the apertures in 11 and 12 are such that the light beams are shielded and cannot pass directly from the object 16 to the plate 15 but must be reflected back from the concave spherical surface 18 upon the convex spherical surface 17 and from 17 to the plate 15 as has just been described. This result is secured by the angular displacement of the apertures in 11 relative to the apertures in 12. If the apertures in 11 were radially arranged on the centre 31 of the neutral axis $a$—$a$ of the system and the apertures in 12 were parallel to this axis, it is apparent that light rays would pass directly through these apertures from the object to the plate. In order to avoid this condition the aperture 24 adjacent to the axial line $a$—$a$ is deflected from the radial centre 31 so as to spread away from the neutral axis $a$—$a$ instead of converging toward this line as the other apertures do. Thus the light beam 41, passing through the aperture 24, is reflected from the surface 18 upon the surface 17 as indicated at 42 and through aperture 30 reaches the plate at 43. The staggered arrangement between the apertures 24 and aperture 30 prevents the light from passing directly through to the plate. It is to be understood that the opposite half of the reflectors 11 and 12 are developed similar to that shown in the drawings in which, for instance, the light beams 41' pass through the apertures 24' in 11 and is reflected back to pass through the aperture 30 in 12 and reach the plate as indicated in 43'.

It is to be observed that the apertures in 11 isolate specific light rays from the object and permit these rays to pass through the system, while shielding or preventing other rays, particularly resulting oblique rays, from passing through the system. The extent to which the rays are shut off is determined by the width and depth of the apertures, at 19, 20, 21, etc. It will also be observed that the light rays cross at 31 between the lens and the object and that inside the camera the light rays are substantially direct between the lens and the plate and are substantially parallel with the neutral axis $a$—$a$, thus providing uniform illumination for the entire surface of the plate.

Some of the advantages in this arrangement may be enumerated as follows:

(a) The lens may have a wide angle, the angle $\alpha$ in the illustration being upwards of 90°;

(b) The lens is substantially equal to the size of the plate;

(c) The light rays reaching the plate from the lens being substantially parallel, there is no distortion such as results from extreme oblique rays passing through the usual wide angle lens;

(d) The apertures in reflector 12 cooperate with the apertures in reflector 11 in isolating the light rays and in shutting out the oblique rays.

Figure 1:
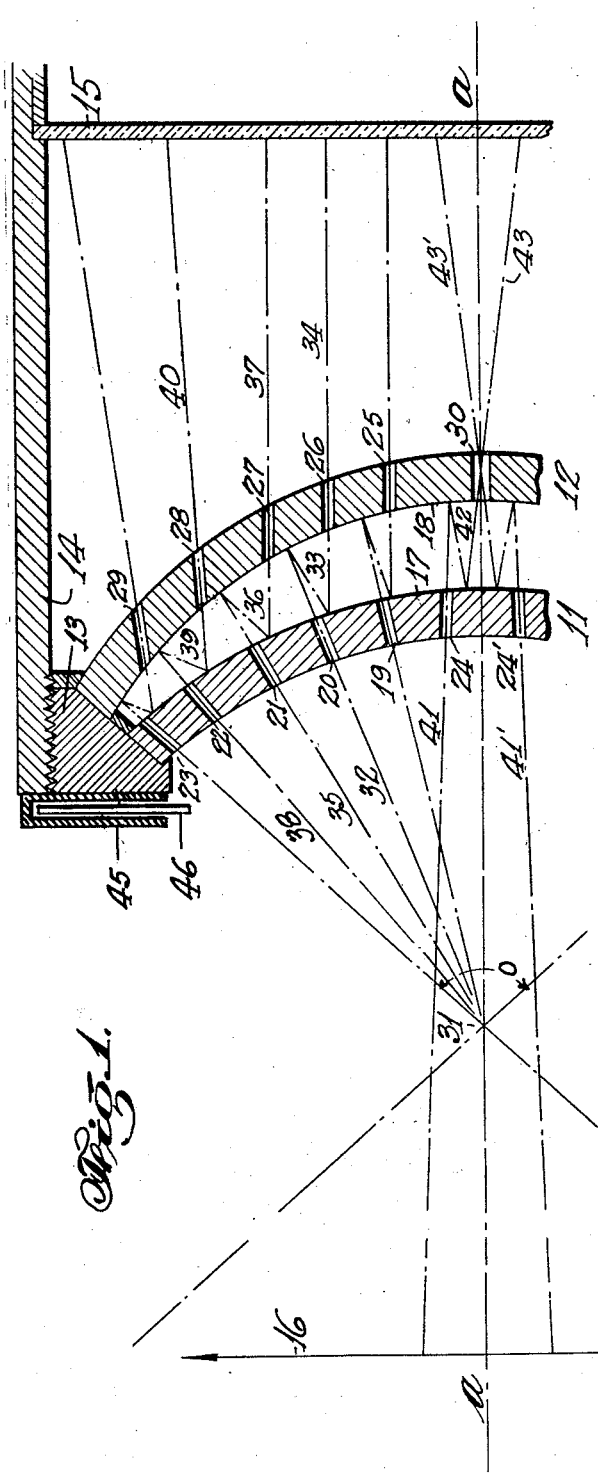

The illustration in Fig. 4 shows the spread of the light beams as obtained by the arrangement in Fig. 1, in which the beam $b$ is passed through apertures 23 and 29 producing the image 55 by the beams $b'$, in the same way beam $c$ passes through apertures 22 and 28 and produces an image at 55 as indicated at $c'$. Also the light beam $d$ passes through apertures 21 and 27 and forms an image at 55 as indicated by $d'$ and in the same way the beam $e$ passes through apertures 20 and 26 producing the image at 55 as indicated by $e'$. It will be observed that the beams $b'$ and $c'$ overlap at 56 and the beams $c'$ and $d'$ overlap at 57 and the beams $d'$ and $e'$ overlap at 58. In the position of the image at 55 it will be noted that a complete overlap of the images through the apertures is obtained and the extent of the overlap may be increased by increasing the focal length of the system or by increasing the number of apertures in the lens.

It will be observed that the spaces 53 and 54 between the reflecting surfaces 17 and 18 are not occupied by any light rays so that these spaces may be blocked off in any suitable manner desired.

It should be noted that the space between 11 and 12 might be constructed in the form of a glass lens in which the opposing faces are suitably silvered to form reflecting surfaces where the light beams strike them and the apertures in 11 and 12 can be suitably arranged in a shield which is placed against the lens.

Where it is desired to reduce the angle of view of the system and prevent certain rays from reaching the inside of the camera, an iris diaphragm may be provided as indicated at 46 and mounted in frame 45 in front of the lens.

The arrangement in Fig. 5 shows the application of my invention to a meniscus lens in which a shielding device is provided with a spherical surface to engage the spherical surface of the lens and with suitable apertures to isolate and direct the light rays to secure the results desired. The shielding device 62 is preferably of honeycomb construction with the apertures radially disposed towards the centre 31 and formed by the walls 67, 68, etc., and is placed against the lens 68 as shown. In this arrangement the light rays 71 pass through the aperture 63 and reach the plate as indicated by 75, the beam 72 passes through aperture 64 and reaches the plate 76, the beam 73 passes through 65 and reaches the plate 77 and the beam 74 passes through 66 and reaches the plate by 78. The beams 75, 76, 77 and 78 are substantially parallel to the neutral axis $a$—$a$ while the beams 71, 72, 73 and 74 converge upon 31.

The operation of the shielding device will be understood by considering the upper limit of the light beam through aperture 63 which is limited as indicated by line 81 so that the part of the object 16 above this line is not projected through 63. In the same way, line 82 indicates the upper limits of the light beam through 64 so that the image of 16 above 82 is not projected through 64 and in the same way the light through 65 is limited by 83 and the image of object 16 above 83 cannot be projected through 65. This eliminates those rays which would produce aberration in the image by preventing an enlarged area of the lens from sighting the object. This enables a lens of much greater diameter to be used in photography without sacrificing any accuracy in the composition of the image.

This system may be computed as a plurality of lenses, as each selected area of the lens covers a specific angle of sight with a corresponding image on the plate projected in superimposed relation to the images from adjacent selected areas. Thus, the speed of the system is not determined by the area of the entire lens in connection with its focal length, but by the sum of the sights of each selected area projecting images in superimposed relation and the light travel to the plate from the lens.

The illustration in Fig. 7 corresponds to Fig. 5 with the shielding device 62a having apertures formed by the walls 67a placed on the opposite face of lens 61 as shown.

It should be noted that the apertures in the shield may be formed in a spiral from the centre and the shield may be rotated about its axis to give greater depth to the picture.

The arrangement shown and described for isolating and controlling light rays can be applied in a variety of forms either with lenses or reflectors and my invention includes a full range of equivalents.

Having thus described my invention, I claim:

1. In an optical system, the combination, a reflector with a spherical surface, and a shield with a spherical surface for said reflector, said shield comprising means for substantially isolating the light into separate rays in a specific direction as received by said reflector and for intercepting rays from other directions.

2. In an optical system, the combination, a reflector with a spherical surface, a shield with a spherical surface to match the surface of said reflector, said shield having apertures radially spaced on its surface to permit the passage of light rays through said system in a predetermined direction and to prevent the passage of light rays from other directions through said system.

3. In an optical system, the combination, a plate, a light receiving surface with a shield, said shield having apertures to isolate and permit the light rays from an object when illuminated to pass through said system in a predetermined direction and to project the image of the object from said rays in superimposed relation on said plate.

4. In an optical system, the combination of a plate, a reflector and a shield, said shield having apertures to isolate and permit the light rays from an object when illuminated to pass through said system in a predetermined direction whereby the image of the object is projected in substantially parallel rays on said plate.

5. In an optical system, the combination of a reflector, a shield, and a plate, said shield having apertures to isolate and permit the light rays from an object when illuminated to pass through said system in a predetermined direction whereby the image of the object is projected on said plate and said plate is uniformly illuminated.

6. In an optical system, the combination of a spherical reflector and a spherical shield shaped to match said reflector, said shield having elongated apertures to isolate the light rays received by said system and to prevent oblique rays being projected from the system.

7. In an optical system, the combination of a spherical light receiving surface and a light projecting surface, means for shielding the light rays adjacent to said surfaces comprising an opaque spherical shaped mounting with apertures to isolate and permit the passage of light rays through said mounting in a given direction and to prevent the passage of other light rays through said mounting.

8. In an optical system, the combination of a spherical light receiving surface and a light projecting surface and means for shielding the light rays reaching said surfaces, comprising a spherical shaped mounting with apertures to isolate and permit the passage of light rays through said mounting in a given direction and to prevent the direct passage of light rays through said mounting.

9. In an optical system, the combination of a spherical light receiving surface and a light projecting surface and means for shielding the light rays reaching said surfaces, comprising a spherical shaped mounting with apertures to permit the passage of light through said mounting, said apertures on each of said surfaces being placed in staggered relation to each other.

10. In an optical system, the combination of a light receiving surface and a light projecting surface and means for shielding the light rays reaching said surfaces comprising a mounting with apertures to permit the passage of light rays through said mounting, said apertures controlling the light rays to one surface being angularly displaced relative to the apertures controlling the light rays to the other surface, whereby direct passage of the light rays through said device is prevented.

11. In an optical system, the combination, a reflector having a concave surface, a second reflector having a convex surface located to oppose said concave surface, said surfaces provided with apertures, a shield for each of said reflectors having apertures to permit the passage of light rays to the concave reflector and to permit the passage of said rays as reflected from the convex reflector.

12. In an optical system, in combination, a reflector having a concave surface, a second reflector having a convex surface, said reflectors being arranged to oppose each other and provided with apertures and a shield for one of said reflectors with a plurality of apertures to permit the passage of light rays to said reflectors in a predetermined direction and to prevent the passage of light rays in other directions.

13. In an optical system, in combination, a pair of spherical reflectors having the concave surface of one opposing the convex surface of the other, said surfaces provided with apertures and arranged to receive and project the light rays from an object through said apertures, means for isolating the light rays into beams of light from the object and means for preventing parallel rays from the object reaching said reflectors.

14. In an optical system, in combination, a pair of spherical reflectors having the concave surface of one opposing the convex surface of the other, said surfaces provided with apertures and arranged to receive and project the image of an object through said apertures, means for isolating the light rays into beams of light from the object and means for projecting said rays in substantially horizontal lines.

15. An optical system comprising a light deflector and means associated with said light deflector to isolate and permit the passage of light rays through said light deflector in a given direction and to prevent the passage of other light rays through said light deflector, said means comprising a pair of opposed reflecting surfaces.

16. An optical system comprising a light deflector and means associated with said light deflector comprising a pair of reflecting surfaces to permit the passage of light rays through controlled areas of said light deflector, the images from adjacent areas being projected in superimposed relation.

17. An optical system comprising a light deflector and means associated with said light deflector comprising a pair of opposed reflecting surfaces to permit the passage of light rays through controlled areas of said light deflector, said rays being projected in substantially parallel beams.

CYRIL O. ASSMUS.